(12) United States Patent
Ko

(10) Patent No.: US 9,369,603 B2
(45) Date of Patent: Jun. 14, 2016

(54) IMAGE FORMING APPARATUS AND DIAGNOSING METHOD THEREROF

(71) Applicant: Samsung Electronics Co., Ltd., Suwon-si, Gyeonggi-do (KR)

(72) Inventor: Dae-gun Ko, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/631,072

(22) Filed: Feb. 25, 2015

(65) Prior Publication Data

US 2015/0365557 A1    Dec. 17, 2015

(30) Foreign Application Priority Data

Jun. 16, 2014    (KR) .................. 10-2014-0073040

(51) Int. Cl.
*H04N 1/04*    (2006.01)
*H04N 1/10*    (2006.01)

(52) U.S. Cl.
CPC .................................. *H04N 1/1026* (2013.01)

(58) Field of Classification Search
CPC .............. H04N 5/2252; H04N 5/2354; H04N 13/0203; H04N 13/0402; H04N 13/0418; H04N 1/00278; H04N 1/0057; H04N 1/00602; H04N 1/00618; H04N 1/0062; H04N 1/00832; H04N 1/04; H04N 1/0461; H04N 1/06

USPC .......... 399/346, 254, 27, 358, 37, 40, 44, 69, 399/71, 82; 358/1.15, 474, 497, 486; 382/118

See application file for complete search history.

(56) References Cited

U.S. PATENT DOCUMENTS

| | | | | |
|---|---|---|---|---|
| 4,558,223 A | * | 12/1985 | Broadhurst et al. | .......... 250/374 |
| 5,670,286 A | * | 9/1997 | Takei | ................. G03G 5/08221 |
| | | | | 399/159 |
| 6,169,815 B1 | * | 1/2001 | Aoki et al. | ..................... 382/100 |
| 2001/0051308 A1 | * | 12/2001 | Kawamura | ......... G03G 5/08221 |
| | | | | 430/66 |
| 2002/0098438 A1 | * | 7/2002 | Hashizume | ........ G03G 5/08285 |
| | | | | 430/124.51 |
| 2002/0168859 A1 | * | 11/2002 | Ehara | ........................ G03G 5/08 |
| | | | | 438/694 |
| 2004/0065737 A1 | * | 4/2004 | Abramsohn | .................. 235/454 |
| 2005/0281577 A1 | * | 12/2005 | Tamura et al. | .................. 399/81 |
| 2006/0289280 A1 | * | 12/2006 | Furuya et al. | ................ 198/806 |
| 2009/0316222 A1 | * | 12/2009 | Oshida et al. | ................ 358/474 |
| 2012/0286468 A1 | * | 11/2012 | Ui | ................................ 271/228 |
| 2013/0004189 A1 | * | 1/2013 | Hashiguchi et al. | ............ 399/49 |
| 2013/0322904 A1 | * | 12/2013 | Murayama | ...................... 399/66 |

* cited by examiner

*Primary Examiner* — Negussie Worku
(74) *Attorney, Agent, or Firm* — Staas & Halsey LLP

(57) ABSTRACT

An image forming apparatus and diagnosing method are provided. The image forming apparatus includes a scanner configured to scan a manuscript disposed on an upper surface of a plate by using a scan module, and a cover unit disposed on the upper surface of the plate and configured to block external light from being supplied to the scan module while the scanner scanning the manuscript. The cover unit is disposed such that a sheet used for diagnosis and correction for the image forming apparatus disposed corresponds to the plate.

18 Claims, 13 Drawing Sheets

IMAGE FORMING APPARATUS AND DIAGNOSING METHOD THEREROF

CROSS-REFERENCE TO RELATED APPLICATIONS

This application is related to, and claims priority benefit from, Korean Patent Application No. 10-2014-0073040, filed in the Korean Intellectual Property Office on Jun. 16, 2014, the disclosure of which is incorporated herein by reference.

BACKGROUND

1. Field

A method and an apparatus relate to an image forming apparatus and a diagnosing method thereof. In particular, exemplary embodiments relate to an image forming apparatus that is able to diagnose and correct using an original chart disposed on a cover unit of the image forming apparatus, and a diagnosing method thereof.

2. Description of the Related Art

Generally, an image forming apparatus refers to an apparatus that prints printing data generated in a print control terminal apparatus such as a computer on a recording sheet. Such image forming apparatus may be a copy machine, a printer, a facsimile, or a Multi Function Peripheral (MFP) that performs a variety of functions such as copying, printing, or faxing.

Characteristics of a printout of an image forming apparatus may become different from those of the printout at initial manufacture and installation according to usage time, the number of times of printing, and temperature and humidity of an environment where a product was installed. To attempt to solve such a problem, a user (or a manger) may perform diagnosis and correction for an image forming apparatus by using an original chart for diagnosis and correction.

Conventionally, a manufacturer produced and distributed such an original chart for diagnosis and correction as a separate item. There was a problem in that diagnosis and correction could not be performed appropriately, because when the original chart was provided as a separate item and was not well managed, the original chart could be damaged. In addition, there was a possibility of losing the original chart.

Moreover, at a point of time when diagnosis and correction were necessary, the image forming apparatus may be able to directly print and use the original chart, but when color properties of the image forming apparatus were changed, color correction could not be performed accurately.

In addition, when a user of the machine did not have access to the the original chart, there was a problem that when a service call was performed to attempt diagnosis and correction with the original chart, the user wasted cost and time, for example, for a possibly simple diagnosis and correction that the user could handle alone.

SUMMARY

Additional aspects and/or advantages will be set forth in part in the description that follows and, in part, will be apparent from the description, or may be learned by practice of the invention.

Aspects of the exemplary embodiments relate to an image forming apparatus that is able to diagnose and correct by using an original chart disposed on a cover unit of the image forming apparatus and a diagnosing method thereof.

According to an exemplary embodiment, an image forming apparatus includes scanner that scans a manuscript disposed on an upper surface of a plate by using a scan module, a cover unit that prevents the scan module from being supplied with external light while the scanner is scanning a manuscript, and the cover unit is disposed such that a sheet used for diagnosis and correction for the image forming apparatus corresponds to the plate.

The cover unit may include a belt unit where an original chart and a white background sheet are disposed in a form of a belt in a row, and a driving unit that operate the belt unit.

The image forming apparatus may include a controller that, in response to diagnosis or correction for the image forming apparatus being necessary, controls the driving unit to dispose the original chart on an upper surface of the plate, and in response to the scanner completing scanning of the original chart, controls the driving unit to dispose the white background sheet on an upper surface of the plate.

The belt unit may be disposed such that the original chart is on a predetermined fixed position of an upper surface of the plate.

The cover unit may include a belt unit where an original chart and a transparent sheet are disposed in a form of a belt in a row, an original chart unit where the original chart is disposed on a fixed position in a space between belts of the belt unit, and a driving unit that operates the belt unit.

The image forming apparatus may include a controller that, in response to diagnosis or correction for the image forming apparatus being necessary, controls the driving unit to dispose a transparent sheet between the original chart and an upper surface of the plate, and in response to the scanner completing scanning of the original chart, controls the driving unit to dispose a white background sheet between the original chart and an upper surface of the plate.

The cover unit may further include a chart driving unit that, in response to a transparent sheet being disposed between the original chart and the upper surface of the plate, operates to place the original chart unit directly onto the transparent sheet.

The cover unit may include a display that is disposed on a fixed position of the upper surface of the plate to display a white background screen in response to the scanner operating a normal scan, and to display an image corresponding to an original chart in response to diagnosis or correction for the image forming apparatus being necessary.

The cover unit may include an original chart unit disposed on a fixed position of an upper surface of a plate, and a open-close cover that is disposed between an upper surface of the plate and the original chart unit and in response to being closed, disposed such that a white background sheet is on an upper surface of the plate, and opens the original chart unit by a user manipulation.

The image forming apparatus may include a user interface that, in response to diagnosis or correction for the image forming apparatus being necessary, displays information on operation by manipulating the open-close cover, and a controller that, in response to the original chart being disposed on an upper surface of the plate by an operation of the open-close cover, controls the scanner to scan the original chart.

In response to diagnosis or correction for the image forming apparatus being necessary, the image forming apparatus may include a controller that controls the scanner to scan the sheet.

The controller may determine whether diagnosis or correction is necessary based on at least one from among the number of times of printing, toner usage, replacement of consumables, and a request of a user.

The image forming apparatus may include an image forming unit that prints the scanned original chart, the scanner may generate a second scan image by scanning the printed original chart, and the controller may diagnose or correct copy performance of the image forming apparatus by using the second scan image.

The controller may diagnose at least one from among a copy margin, copy skew, copy magnification, copy optical density (OD), and a copy background of the image forming apparatus.

The image forming apparatus may include a storage that stores at least one from among a color conversion table and a parameter table, and a correction unit that changes at least one from among the color conversion table and the parameter table by using the second scan image.

The image forming apparatus may include a user interface that displays a result of the diagnosis.

A diagnosing method of an image forming apparatus including a scanner and a cover unit that prevents the scanner from being supplied with external light according to an exemplary embodiment includes determining whether diagnosis or correction is necessary, disposing an original chart positioned within the cover unit on a upper surface of the scanner in response to diagnosis or correction being necessary, scanning and printing the original chart, disposing a white background sheet positioned in the cover unit on a upper surface of the scanner, and diagnosing copy performance of the image forming apparatus by scanning the printed original chart.

The method may include changing at least one from among a pre-stored color conversion table and a parameter table by using a scan image of the printed original chart.

The diagnosing may diagnose at least one item from among a copy margin, copy skew, copy magnification, copy optical density (OD), and a copy background of the image forming apparatus.

The diagnosing method may include displaying a result of the diagnosis.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Hereinafter, exemplary embodiments will be described in detail with reference to the accompanying drawings.

Figure 1:
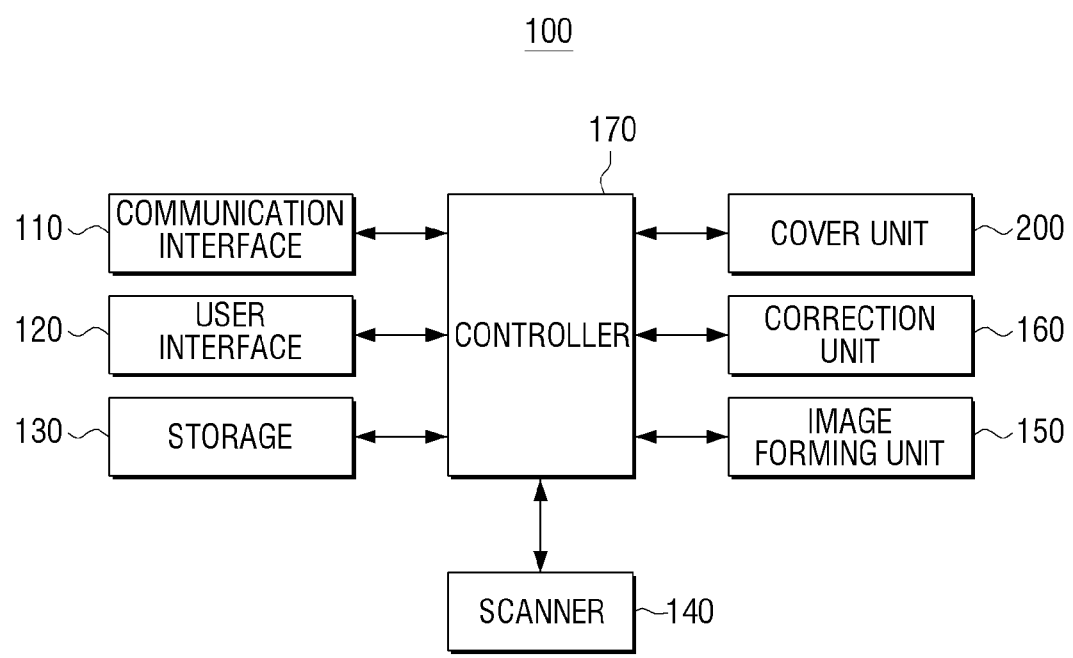
FIG. 1 illustrates an image forming apparatus according to an exemplary embodiment.

FIG. 1 is a block diagram illustrating a configuration of an image forming apparatus according to an exemplary embodiment.

As illustrated in FIG. 1, an image forming apparatus 100 includes a communication interface 110, a user interface 120, a storage 130, a scanner 140, an image forming unit 150, a correction unit 160, a cover unit 200, and a controller 170. The image forming apparatus 100 (or an image reading apparatus) may be a copy machine, a printer, a facsimile, or a Multi Function Peripheral (MFP) that performs that performs a variety of functions such as copying, printing, or faxing.

The communication interface 110 may be connected to a host apparatus (not illustrated) such as a personal computer (PC), a notebook PC, a personal digital assistant (PDA), and a digital camera, etc., and may transmit scan data scanned in the image forming apparatus 100 to the host apparatus. The communication interface 110 may be formed to connect the image forming apparatus 100 to an external apparatus, and may access a terminal apparatus through a local area network (LAN) and/or the Internet network and/or through a universal serial bus (USB).

The communication interface 110 may receive printing data from the host apparatus (not illustrated). The communication interface may receive a command to diagnose and correct from the host apparatus (not illustrated). The communication interface 110 may inform the host apparatus of results of the diagnosis and the correction by operations of diagnosis and correction.

The user interface 120 may be equipped with a plurality of function keys that a user may use to set or select various functions supported by the image forming apparatus 100, and displays various types of information provided from the image forming apparatus 100.

The user interface 120 may be embodied as an apparatus that may input and output simultaneously such as a touch screen, or may be embodied as an apparatus where a mouse and a monitor may be combined. The user may input a command to diagnose and correct for diagnosis and correction for the image forming apparatus 100 through a user interface window provided from the user interface 120.

Figure 9:
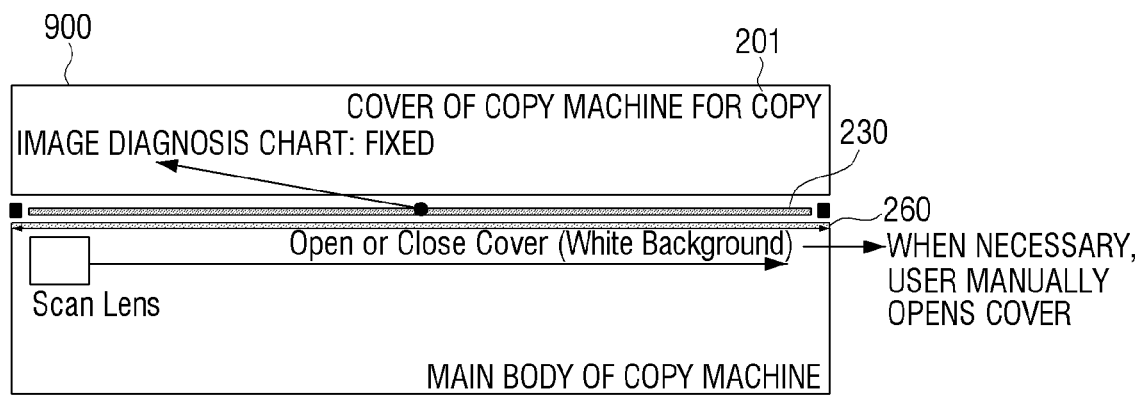
FIG. 9 illustrates a cover unit according to a fifth exemplary embodiment.

The user interface 120 may inform a host apparatus of a result of diagnosis and correction by operations of diagnosis and correction. In response to the cover unit 200, operating manually as illustrated in FIG. 9, and in response to diagnosis and correction for the user interface 120 being necessary, a message indicating that a manual open-close cover needs to be manipulated to dispose an original chart on an upper surface of a plate may be displayed. In response to the user interface 120 completing scanning of the original chart, a message indicating the manual open-close cover should be re-manipulated to dispose a white background sheet on an upper surface of the plate may be displayed.

The storage 130 stores printing data. The storage 130 may store printing data received from the above-described communication interface 110. Such storage 130 may be embodied not only as a storage medium in the image forming apparatus 100, but may be embodied as an external storage medium, a removable disk including a USB, and/or a web server through a network.

The storage 130 stores a color conversion table. The color conversion table is a lookup table in which converted values to convert colors in RGB color space to colors in CMYK color space in order to reproduce the colors in RGB color space within the printing data in an image forming apparatus that uses the colors in CMYK color space. According to an exemplary embodiment, a color conversion table may be used for converting the RGB color space to the CMYK color space.

However, depending on an exemplary embodiment, the color conversion table may be used to convert to the CMYK color space from a color space other than the RGB color space.

The storage 130 may store a plurality of color conversion tables. The storage 130 may store a one-dimensional gamma table, a RGB color table for scanning, a RGB color table for printing, a panel table and/or a screen table.

The storage 130 stores a parameter table (or an instrument characteristic parameter table.) The parameter table is a parameter table that stores a correction value such as a copy margin, copy skew, copy magnification, (that is a horizontal/vertical ratio) in order to reproduce the most correct result of a copy material in the characteristics of the present copy apparatus.

Figure 8:
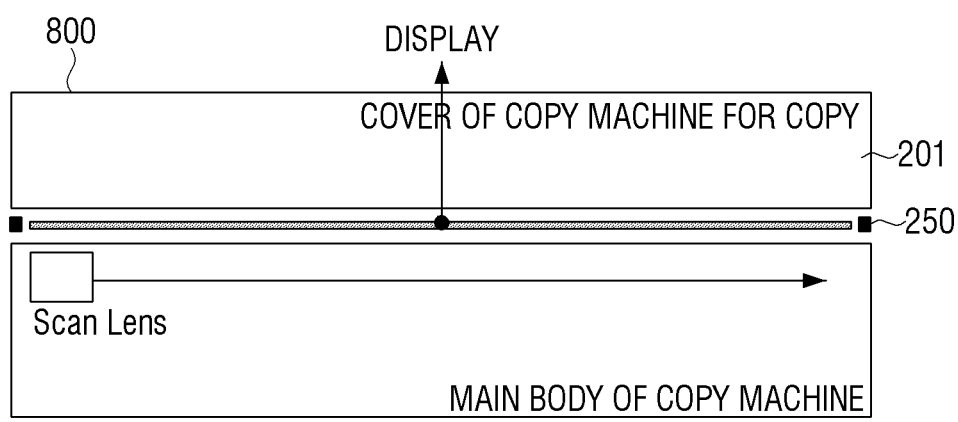
FIG. 8 illustrates a cover unit according to a fourth exemplary embodiment.

The storage 130 stores an image corresponding to an original chart. In response to the cover unit 200 being embodied as an exemplary embodiment as illustrated in FIG. 8, the storage 130 may store an image corresponding to the original chart. The stored image may be provided to a display in the cover unit 200.

The scanner 140 includes a lens that forms an image on an interior image sensor inside the scanner 140 by using a light reflected from a manuscript, and reads the image information of the manuscript from the light formed on the image sensor. The scanner 140 scans an original chart, and provides the correction unit 160 with the scanned original chart. The scanner 140 may provide the correction unit 160 with an image corresponding to the scanned original chart, or may extract color value or location information included in the scanned original chart and provide the correction unit 160 with the extracted information. Meanwhile, such scanner 140 may be located on a FLAT BED, or in Duplex Automatic Document Feeder (DADF).

In response to the scanner 140 being disposed on the FLAT BED (or a plate, hereinafter, referred to as a plate), the scanner may scan a manuscript disposed on an upper surface of a plate by using a scan module. The cover unit 200 may be disposed on an upper surface of the scanner 140, and may prevent the scan module from being supplied with external light while the scanner 140 is scanning. A layout of the scanner 140 and the cover unit 200 are described with reference to FIG. 2.

The image forming unit 150 prints printing data. The image forming unit 150 prints printing data received through the communication interface 110.

The image forming unit 150 prints an original chart. The image forming unit 150 may print an original chart scanned in the scanner 140. The printed original chart may be scanned in the above-described scanner 140 and be generated as second scan data. The generated second scan data may be used to perform diagnosis and correction for performance of the image forming apparatus 100.

The correction unit 160 diagnoses performance of the image forming apparatus 100 by using the second scan data generated in the scanner 140. The correction unit 160 may diagnose a copy margin, copy skew, copy magnification, copy OD, and a copy background by using the generated second scan data.

The copy margin refers to the top, right, bottom, and left margins of a copy output obtained by copying an original. If the copy margin is not appropriately set, a part of the original may not be copied. Such copy margin may be detected through a margin sensing pattern disposed on the left-top/the left-bottom/the right-top/and the right-bottom areas of the original chart.

The copy skew refers to a case in which an object existing within the copy output obtained by copying the original is rotated and output. Such copy skew may be detected through the margin sensing pattern disposed on the left-top/the left-bottom/the right-top/and the right-bottom areas of the original chart, which is identical to the copy margin.

The copy magnification refers to ratio difference between lateral and longitudinal lengths of an original to copy and lateral and longitudinal lengths of batch-copied copy outputs. The copy magnification may be detected through lengths of markers located on the original chart.

The copy optical density (OD) refers to a value that represents optical density of a copy output. Such copy OD may be detected by using a color value in the original chart.

The copy background refers to a case in which a white background of a printout has a different RGB value other than RGB value (255.255, 255). Since an image forming apparatus may not be able to correct such copy background autonomously, and requesting service may be required.

The correction unit 160 corrects performance of an image forming apparatus according to a result of diagnosis. In response to an error in a copy margin, copy magnification, and copy OD, the correction unit 160 may correct the corresponding incorrect matters by using the generated second scan data. In response to an error in a copy background, the image forming apparatus 100 may not be able to correct the copy background autonomously, and thus, the correction unit 160 may control the user interface 120 to display that requesting service is required.

The correction unit 160 may determine whether color correction is necessary by using the copy OD, and in response to the color correction being necessary, may perform the color correction by comparing a color value of a generated second scan data and a color value of a pre-stored original chart. The correction unit 160 may re-define a color mapping characteristic so that a color value included in second scan data that was printed and scanned in the scanner 140 can have a color value of a pre-stored color conversion table.

The cover unit 200 may be disposed on an upper surface of a plate of the scanner 400 to prevent the scan module from being supplied with external light while a scanner is scanning a manuscript. The cover unit 200 may be disposed such that a sheet used for diagnosis and correction for the image forming apparatus 100 corresponds to a plate. The sheet is a sheet where an original chart used for diagnosis and correction for an image forming apparatus or a white background sheet may be disposed selectively on an upper surface of a plate. The cover unit 200 may be embodied in various forms or methods, and exemplary operations and various forms of the cover unit are described later with reference to FIGS. 2, 3, and 5 to 10.

The controller 170 controls elements, e.g., each element of the image forming apparatus 100. The controller 170 may determine whether diagnosis and correction for the image forming apparatus 100 are necessary. The controller 170 may determine whether diagnosis and correction are necessary in consideration of a case in which a command to diagnose and correct is received from a user (that is, a case in which a command to diagnose and correct is input through the communication interface 110 or the command to diagnose and correct is input through the user interface 120), a case in which the number of prints exceeds the predetermined number of prints, a case in which toner usage of an image forming unit exceeds the predetermined toner usage, or a case in which consumables are changed.

If it is determined that diagnosis and correction are necessary, the controller 170 may control the user interface 120 to display that the diagnosis and the correction are performed. The user interface 120 may provide the user with information necessary for diagnosis and correction. For example, if a message to make the printed original chart scanned and the cover unit 200 operate manually, as illustrated in FIG. 9, a message notifying that a cover needs to be opened or closed may be displayed. The user interface 120 may provide information necessary for the diagnosis and the correction to a user. For example, in response to a message for making the printed original chart scanned, and the cover unit 200 operating manually as illustrated in FIG. 9, a message informing that a cover unit should be opened and closed may be displayed.

In response to the cover unit 200 operating automatically, the controller 170 may control the cover unit 200 to dispose an original chart on an upper surface of a plate. In response to the original chart being disposed on the upper surface of the plate, the controller 170 may control the scanner 140 to scan the original chart. If the scanning is completed, the controller 170 may control the cover unit 200 to dispose a white background sheet on the upper surface of the plate in order not to damage the original chart in the cover unit 200, that is, in order to keep the original chart stable.

The controller 170 may control the image forming unit 150 to print the scanned original chart, and may control the user interface 120 to display an informing message to scan the printed original chart.

In response to the printed original chart being scanned, the controller 170 may control the correction unit 160 to perform diagnosis and correction by using the second scan data generated by scanning. The controller 170 may control the communication interface 110 and/or the user interface 120 to provide the user with results of the diagnosis and the correction for the correction unit 160.

The image forming apparatus 100 stores an original chart in the cover unit 200 and thus, may prevent the original chart from being damaged, and facilitate performance of diagnosis and correction for performance of an image forming apparatus easily.

Figure 2:
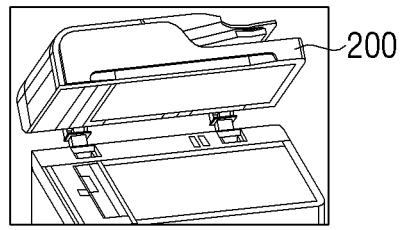
FIG. 2 illustrates an exemplary cover unit.
Figure 3:
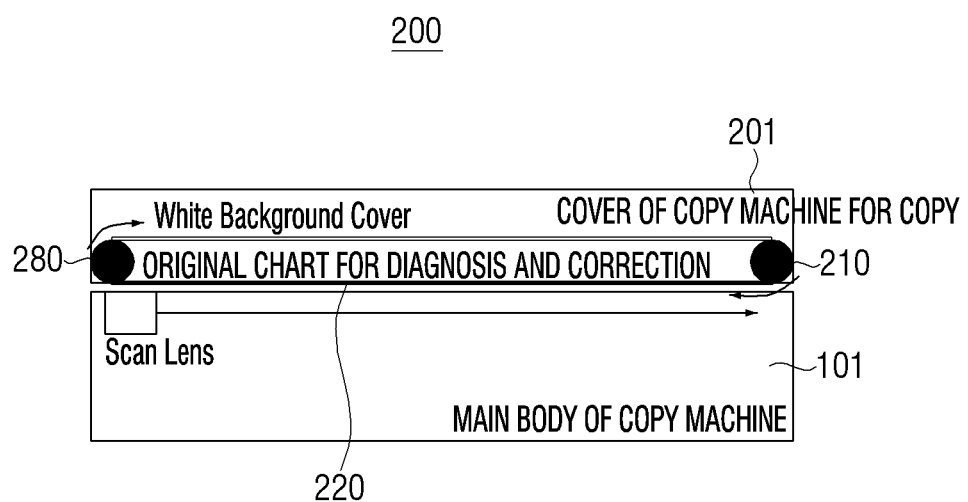
FIG. 3 illustrates an exemplary cover unit.

FIG. 2 is a view illustrating an exemplary cover unit of FIG. 1, and FIG. 3 is a view illustrating an exemplary configuration of the cover unit of FIG. 1.

As illustrated in FIGS. 2 and 3, the cover unit 200 may be disposed on an upper surface of the scanner 140 and may close or open the upper surface of a plate of the scanner 140, for example, through a hinge. FIG. 3, for example, illustrates a rotation roller 280.

Inside the cover unit 200, an original chart and a white background cover or sheet may be disposed, or the original chart or the white background cover or sheet may be disposed selectively on the upper surface of the plate. The cover unit 200 may be embodied in various forms and various exemplary forms are described with reference to FIGS. 5 to 9.

Figure 4:
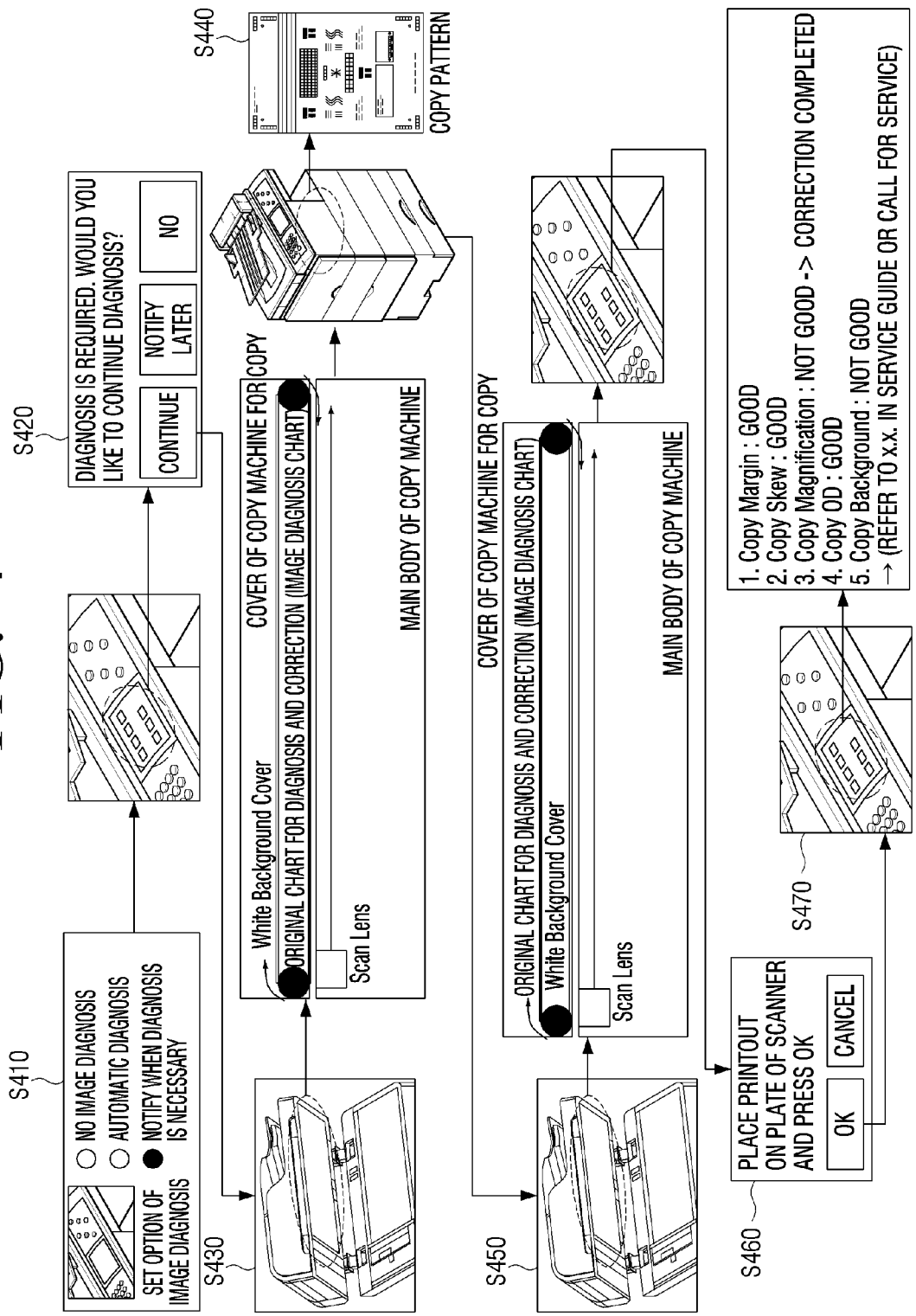
FIG. 4 illustrates a diagnosing method according to an exemplary embodiment.

FIG. 4 is a view illustrating a diagnosing method according to an exemplary embodiment.

As illustrated in FIG. 4, a user may set a diagnosing method (S410). Through a user interface window, for example, a user may select one from among: no diagnosis, automatic diagnosis, and diagnosis after user's confirmation in response to the diagnosis being necessary.

Among options, when performing diagnosis after user's confirmation is set and if a point of time when diagnosis is necessary, such as the excessive number of prints compared with the predetermined number of prints or replacement of consumables, occurs, a message indicating that the diagnosis is necessary (S420) may be displayed to the user.

In response to the user selecting diagnose in the displayed user interface window, the controller 170 may dispose an original chart positioned in the cover unit 200, for example, on the upper surface of the plate (S430). In response to the original chart being positioned on the upper surface of the plate, the controller 170 may scan and print the original chart.

To scan the printed original chart, the controller 170 may position the white background cover or sheet disposed in the cover unit 200 on the upper surface of the plate (S450), and may display a message to the user to place a printing material on the upper surface of the plate and print it (S460).

If the user places the printing material on the upper surface of the plate and selects OK button by such displayed message, the controller 170 may allow a second scan to perform to generate second scan data, and may perform diagnosis and correction by using the generated second scan data.

Results of the diagnosis and the correction may be displayed to the user (S470).

In the diagnosing method according to an exemplary embodiment, a user may perform diagnosis and correction by using a user interface (UI) displayed in an image forming apparatus without using a separate equipment. That is, work required for diagnosis and simple correction may be handled by the user easily without calling for service assistance. In addition, since an original chart is equipped inside the image forming apparatus itself, there is no need to worry about damaging or losing the original chart.

Figure 5:
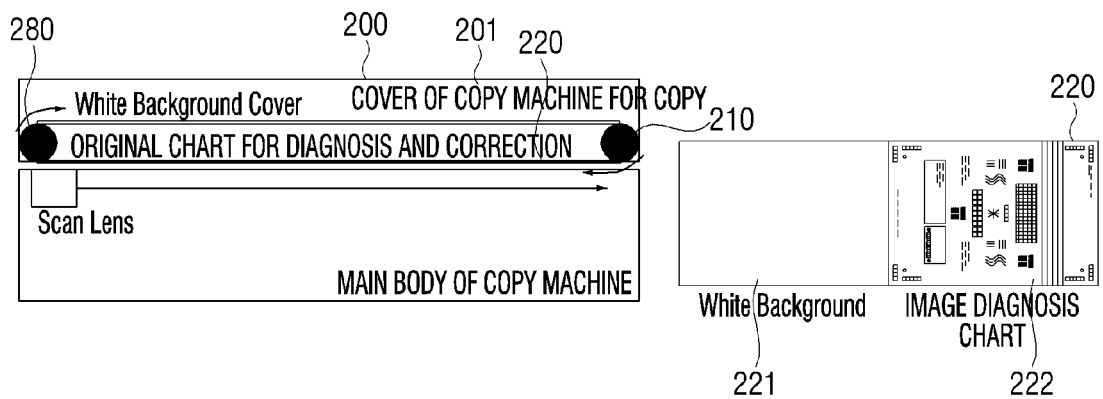
FIG. 5 illustrates a cover unit according to a first exemplary embodiment.

FIG. 5 is a view illustrating a configuration of a cover unit according to a first exemplary embodiment.

As illustrated in FIG. 5, the cover unit 200 includes a cover 201, a driving unit 210, and a belt unit 220.

The cover 201 is an upper case of the image forming apparatus 100 supporting the driving unit 210 and the belt unit 220. A driving unit 210, the belt unit 220, and/or a Duplex Automatic Document Feeder (DADF) may be installed in the cover.

The driving unit 210 drives the belt unit 220. The driving unit 210 may rotate the belt unit 220 according to a control of a controller 170.

In the belt unit 220, an original chart 222 and a white background 221 may be disposed in a form of a belt in a row. In response to an original chart being disposed on an upper surface of a plate by operation of the driving unit 210 (that is, in response to the original chart being moved onto the upper surface of the plate since diagnosis and correction are necessary), the belt unit 220 may be disposed such that the corresponding original chart is on a predetermined fixed position of an upper surface of the plate.

Thus, since the cover unit 200, according to the first exemplary embodiment, is equipped with the driving unit 210 that may automatically operate the belt unit 220, in response to diagnosis and correction being necessary, the cover unit 200 may rotate the belt unit 220 to dispose an original chart on an upper surface of a plate, and in response to the diagnosis and correction not being necessary, the cover unit 200 may rotate the belt unit 220 to dispose a white background sheet on the upper surface of the plate.

Figure 6:
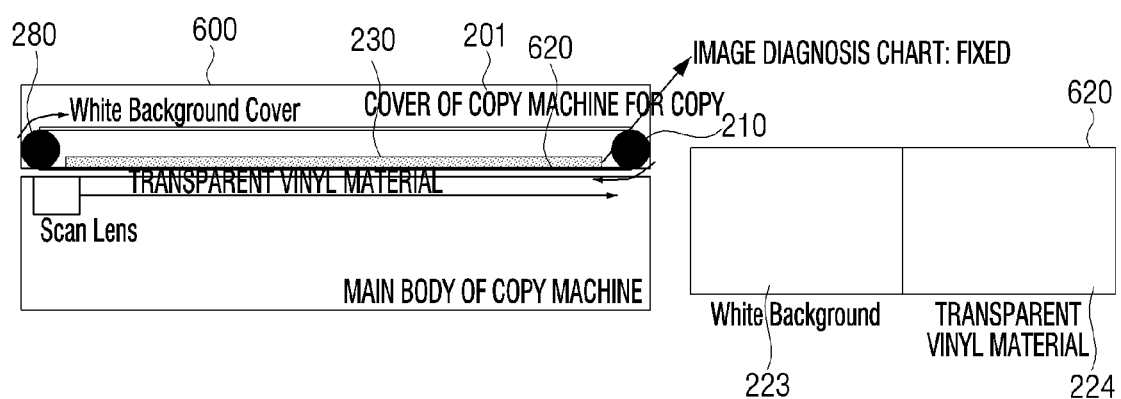
FIG. 6 illustrates a cover unit according to a second exemplary embodiment.

FIG. 6 is a view illustrating a configuration of a cover unit according to the second exemplary embodiment.

As illustrated in FIG. 6, a cover unit 600 includes a cover 201, the driving unit 210, a belt unit 620, and the original chart unit 230.

The cover 201 is an upper case of the image forming apparatus 100 that supports the driving unit 210 and the belt unit 620. The driving unit 210, the belt unit 220, and the DADF may included in the cover 201.

The driving unit 210 operates the belt unit 620. The driving unit 210 may rotate the belt unit 620 according to a control of the above-described controller 170.

In the belt unit 620, a white background 223 and a transparent sheet 224 may be disposed in a form of a belt in a row.

The transparent sheet 224 may be a highly permeable material, and in response to a transparent sheet being disposed on an upper surface of a plate, a scan module may scan the original chart unit 230 disposed on an upper surface of the transparent sheet.

An original chart of the original chart unit 230 may be disposed on a fixed position between in a space between belts of the belt unit 220. The fixed position refers to a position where a general manuscript is scanned. For example, in response to an original chart being in A4 size, the original chart may be disposed to correspond to a position where a piece of A4 paper is scanned on the upper surface of the plate.

Thus, since the cover unit 600 according to the second exemplary embodiment is equipped with the driving unit 210 that operates the belt unit 620 automatically, the cover unit 600 in response to diagnosis and correction being necessary, may rotate the belt unit 220 automatically to dispose a transparent sheet on an upper surface of the plate so that the original chart can be scanned, and in response to the diagnosis and the correction not being necessary, may rotate the belt unit 620 to dispose the white background sheet on the upper surface of the plate.

Figure 7:
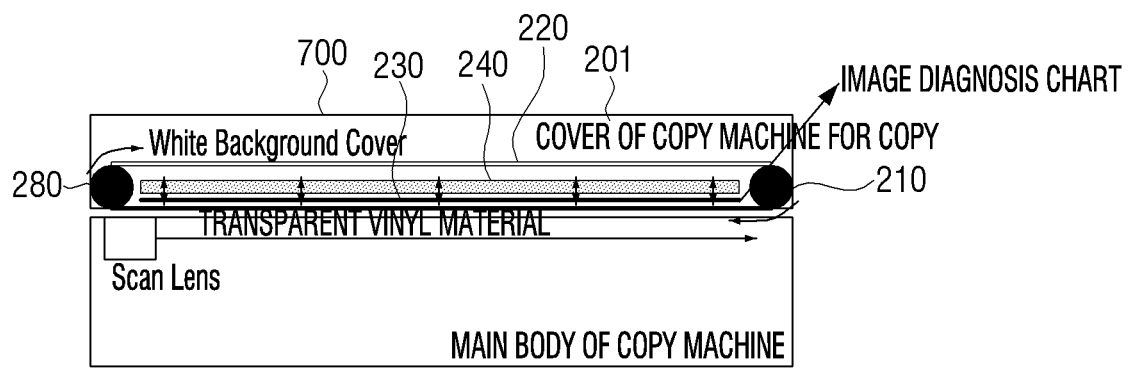
FIG. 7 illustrates a cover unit according to a third exemplary embodiment.

FIG. 7 is a view illustrating a configuration of a cover unit according to the third exemplary embodiment.

As illustrated in FIG. 7, the cover unit 700 includes a cover 201, the driving unit 210, the belt unit 620, the original chart unit 230, and the chart driving unit 240.

The cover 201, the driving unit 210, the belt unit 220, and the original chart unit 230 perform a similar function as that of each element of the cover unit 600 according to the second exemplary embodiment.

In response to a transparent sheet being disposed between an original chart and an upper surface of a plate, the chart driving unit 240 operates to place the original chart unit 230 directly onto the transparent sheet, e.g., transparent vinyl material. In response to the transparent sheet being disposed on the upper surface of the plate to place the original chart unit 230 more directly onto the upper surface of the plate, the chart driving unit 240 may operate the original chart unit 230 to place the original chart unit 230 directly onto the transparent sheet. If the scanning of the original chart is completed, the chart driving unit 240 may operate the original chart 230 to return to its original position.

Thus, since the cover unit 700 according to the third exemplary embodiment may be equipped with the chart driving unit 240 that places an original chart directly onto a plate, image quality degradation by a transparent sheet may be improved.

FIG. 8 is a view illustrating a configuration of a cover unit according to the fourth exemplary embodiment.

As illustrated in FIG. 8, the cover unit 800 includes the cover 201 and the display 250.

The cover 201 performs a similar function as that of a cover of the cover unit 200 according to the first exemplary embodiment of FIG. 5.

The display 250 may be disposed on a fixed position of an upper surface of a plate, may display a white background screen in response to a scanner operating a general scanning mode, and may display an image corresponding to an original chart in response to diagnosis and correction for an image forming apparatus being necessary.

Thus, since the cover 800 according to the fourth exemplary embodiment displays a white background variably and displays an image according to an original chart by using the display, the original chart may be updated in the manner of software without changing the original chart.

FIG. 9 is a view illustrating a configuration of a cover unit according to the fifth exemplary embodiment.

As illustrated in FIG. 9, the cover unit 900 includes a cover 201, the original chart unit 230, and the manual open-close cover 260.

The cover 201 may be an upper case of the image forming apparatus 100 that supports the driving unit 210 and the belt unit 220. The driving unit 210 and the belt unit 220, and the DADF may be included in the cover 201.

The original chart 230 may be disposed on a predetermined position of the cover 201 of an upper surface of a plate. The fixed position refers to a position where a general manuscript is scanned. For example, in response to an original chart being in A4 size, the original chart may be disposed to correspond to a position where a piece of A4 paper is scanned on an upper surface of a plate.

The manual open-close cover 260 may be disposed between an upper surface of a plate and the original chart unit 230, and may open an original chart unit by manipulation of a user. A surface of the manual open-close cover 260 may be white-colored, and in response to diagnosis and correction being necessary, the original chart unit 230 may be moved to a predetermined other position by manipulation of the user in order for the original chart unit 230 to be opened towards the plate.

Thus, since the cover unit 900 according to the fifth exemplary embodiment may dispose an original chart on a cover unit through a simple configuration, the present inventive concept may be embodied at a low manufacturing cost.

Figure 10:
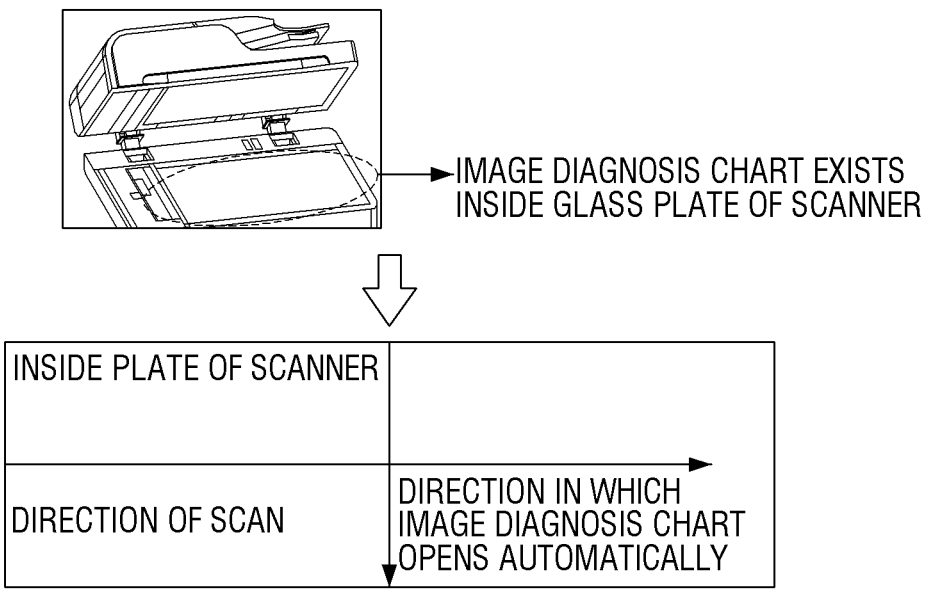
FIG. 10 illustrates an image forming apparatus according an exemplary embodiment.

As described above, an exemplary an original chart may be disposed on a cover unit of an upper surface of a plate, but depending on an exemplary embodiment, the original chart may be disposed in other locations, for example, on a cover unit of a bottom surface of the plate, as described, for example, with reference to FIG. 10.

FIG. 10 is a view illustrating a form of an image forming apparatus according to another exemplary embodiment.

As illustrated in FIG. 10, in response to diagnosis and correction for an image forming apparatus being necessary, an original chart is unfolded between a plate and a scan module. In response to scanning of the original chart being completed, the original chart is disposed on one portion of a bottom surface of the plate. Such moving direction of the original chart may be vertical to the moving direction of the scan module, but is not limited thereto.

Figure 11:
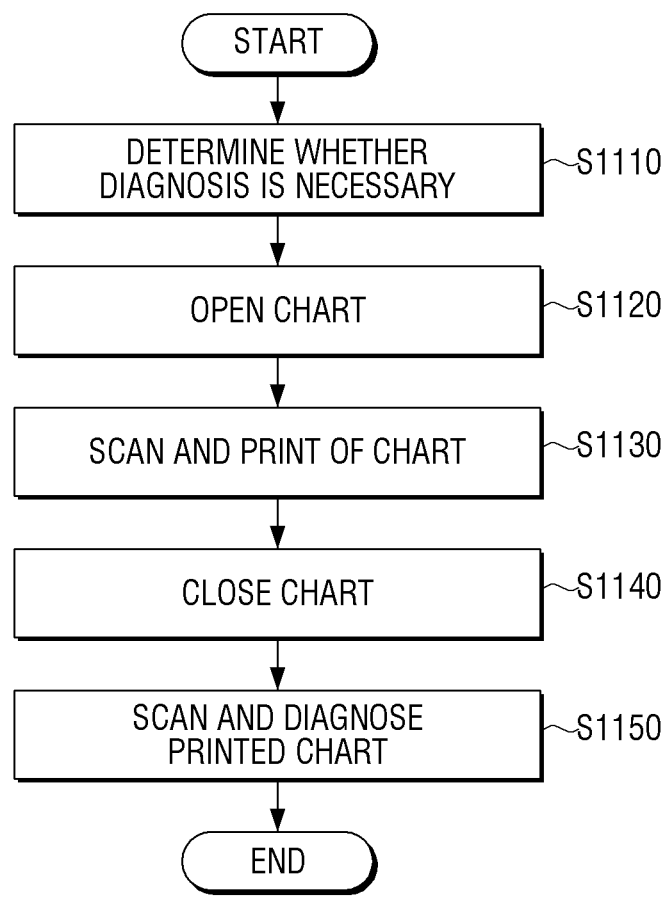
FIG. 11 illustrates a diagnosing method according to an exemplary embodiment.

FIG. 11 illustrates a diagnosing method according to an exemplary embodiment.

As illustrated in FIG. 11, it is determined whether diagnosis and correction for an image forming apparatus is necessary (S1110). Exemplary details of the determining method are described with reference to FIG. 13.

In response to diagnosis and correction being necessary, an original chart disposed inside the cover unit is disposed on an upper surface of a plate of a scanner (S1120). In response to the cover unit being embodied as illustrated in FIGS. 5 to 7, a driving unit may be operated to dispose the original chart on the upper surface of the plate. In addition, in response to the cover unit being embodied as illustrated in FIG. 8, the display may be controlled to display an image corresponding to the original chart. Furthermore, in response to the cover unit being embodied as illustrated in FIG. 9, by displaying a message indicating that a manual open-close cover needs manipulation, a user may be allowed to manipulate the manual open-close cover.

In response to the original chart being disposed on an upper surface of the plate, the original chart is scanned and printed out (S1130).

A white background sheet disposed inside the cover unit may be disposed on the upper surface of the plate of the scanner (S1140). In response to the cover unit being embodied as illustrated in FIGS. 5 to 7, the driving unit may be operated to dispose the white background sheet on the upper surface of the plate. In response to the cover unit being embodied as illustrated in FIG. 8, the display may be controlled to stop displaying operation or may be controlled to display a white background. In addition, in response to the cover unit being embodied as illustrated in FIG. 9, by displaying a message indicating that a manual open-close cover needs manipulation, the user may be allowed to manipulate the manual open-close cover.

Performance of an image forming apparatus is diagnosed by scanning a printed original chart (S1140). Specifically, a second scan image may be generated by scanning the printed original chart, and a copy margin, copy skew, copy magnification, copy OD, and a copy background may be diagnosed by using the generated second scan image.

Subsequently, an item that needs to be corrected according to a result of the diagnosis may be corrected and the result of the correction may be displayed to the user.

Accordingly, since the diagnosing method stores an original chart in the cover 200 and uses it, the original chart may be prevented from being damaged, and diagnosis and correction for performance of an image forming apparatus may be performed easily. The diagnosing method as illustrated in FIG. 11 may be executed in the image forming apparatus 100 that has the configuration of FIG. 1, and may be executed in an image forming apparatus that has other configuration.

The above-described diagnosing method may be embodied as a program that includes an algorithm executable in a computer (specifically, an application executable in an image forming apparatus, for example, an Android Operating System (OS)-based application) and the program may be stored in a non-transitory computer readable medium and be provided.

The non-transitory readable medium does not refer to a medium storing data for a short moment such as a register, a cache, or a memory, but refers to a medium that is capable of storing data semi-permanently and reading the data by an apparatus. The non-transitory readable medium may be a compact disc (CD), a digital versatile disk (DVD), a hard disk, a Blu-ray disk, a universal serial bus (USB), a memory card, and a read only memory (ROM).

Figure 12:
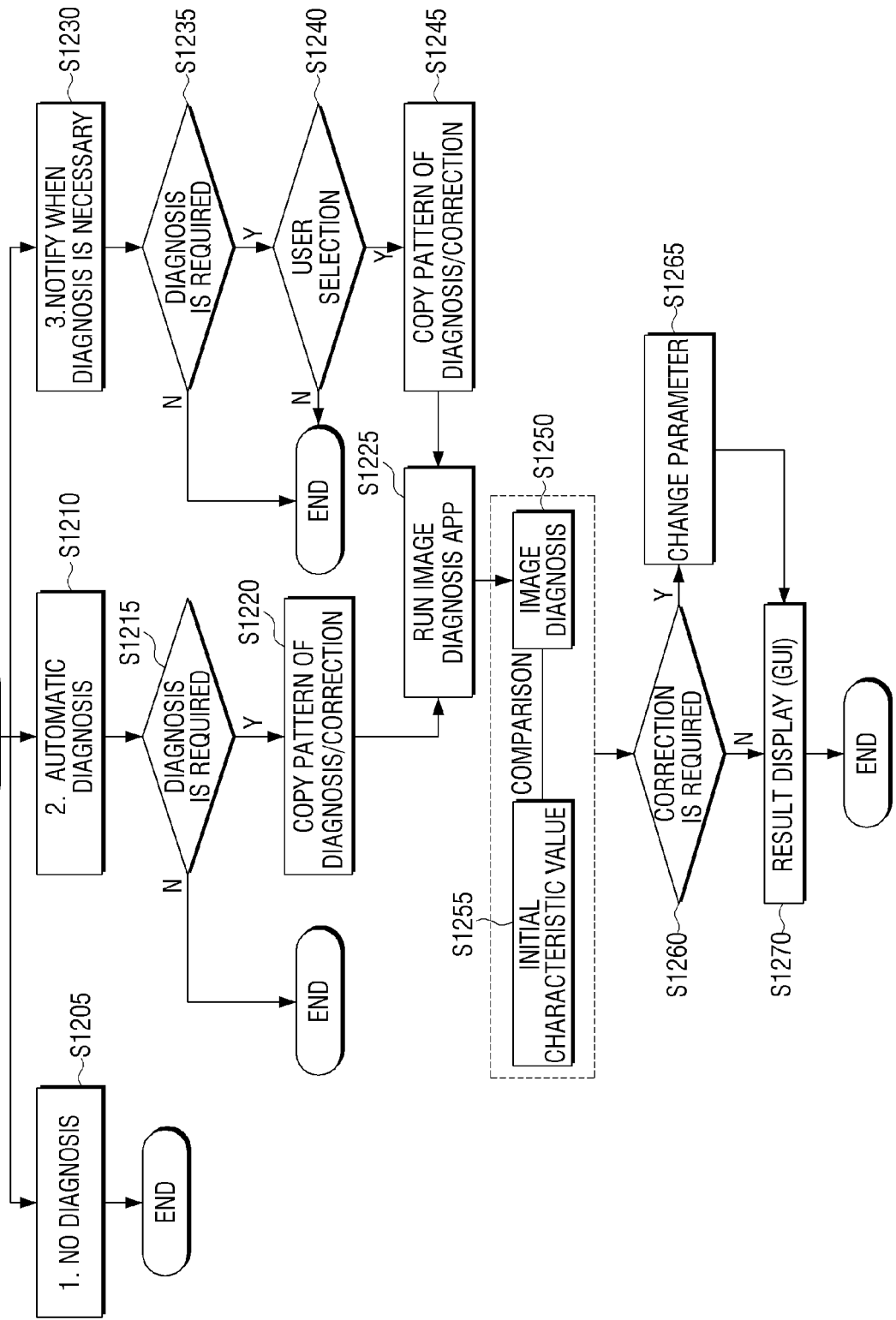
FIG. 12 illustrates a diagnosing method according to an exemplary embodiment.

FIG. 12 is a detailed flowchart illustrating a diagnosing method according to an exemplary embodiment.

As illustrated in FIG. 12, a user may set an option by selecting one of diagnostic modes: "no diagnosis" (S1205), "automatic diagnosis" (S1210), and "notify when diagnosis is necessary (S1230). In response to the user setting the mode as "no diagnosis" (S1205), the diagnosis as illustrated in the exemplary embodiment is not performed.

In response to the user setting the mode as "automatic diagnosis" (S1210), it is determined whether diagnosis is necessary (S1215). Exemplary details of the determining are described later with reference to FIG. 13.

In response to diagnosis being determined to be necessary (S1215—Y), the cover unit 200 may be controlled to print an original chart. (S1220). The cover unit may be controlled to dispose the original chart on an upper surface of a plate, and the original chart is copied. The cover unit may be controlled not to dispose the original chart on the upper surface of the place, that is, controlled to dispose a white background sheet on the upper surface of the plate, and second scan data may be generated by scanning the printed original chart.

An application for diagnosis and correction may be operated to perform diagnosis and correction by using the generated second scan data (S1225).

In response to the user setting the mode as notify when diagnosis is necessary (S1230), it may be determined whether diagnosis is necessary (S1235). Exemplary details of the determining whether diagnosis is necessary are described with reference to FIG. 13.

In response to the diagnosis being determined to be necessary (S1240—Y), that diagnosis is necessary may be displayed to the user. If the user decides to continue the diagnosis, the original chart may be printed and second scan data for the original chart may be generated (S1245).

In response to the application for diagnosis and correction being operated, it is determined whether correction is necessary by mutually comparing a pre-stored initial characteristic value (S1255) and a characteristic value extracted from the second scan data (S1250).

In response to the correction being necessary (S1260—Y), a parameter inside an image forming apparatus is modified (S1265). For example, parameters such as Geometry and OD may be modified.

Results of the diagnosis and the correction may be displayed (S1270). In this regard, in response to an error existing in an item such as a copy background, etc., that is, in response to an error existing in an item that an image forming apparatus cannot correct by itself, information necessary for connecting to a service center may be displayed together.

Figure 13:
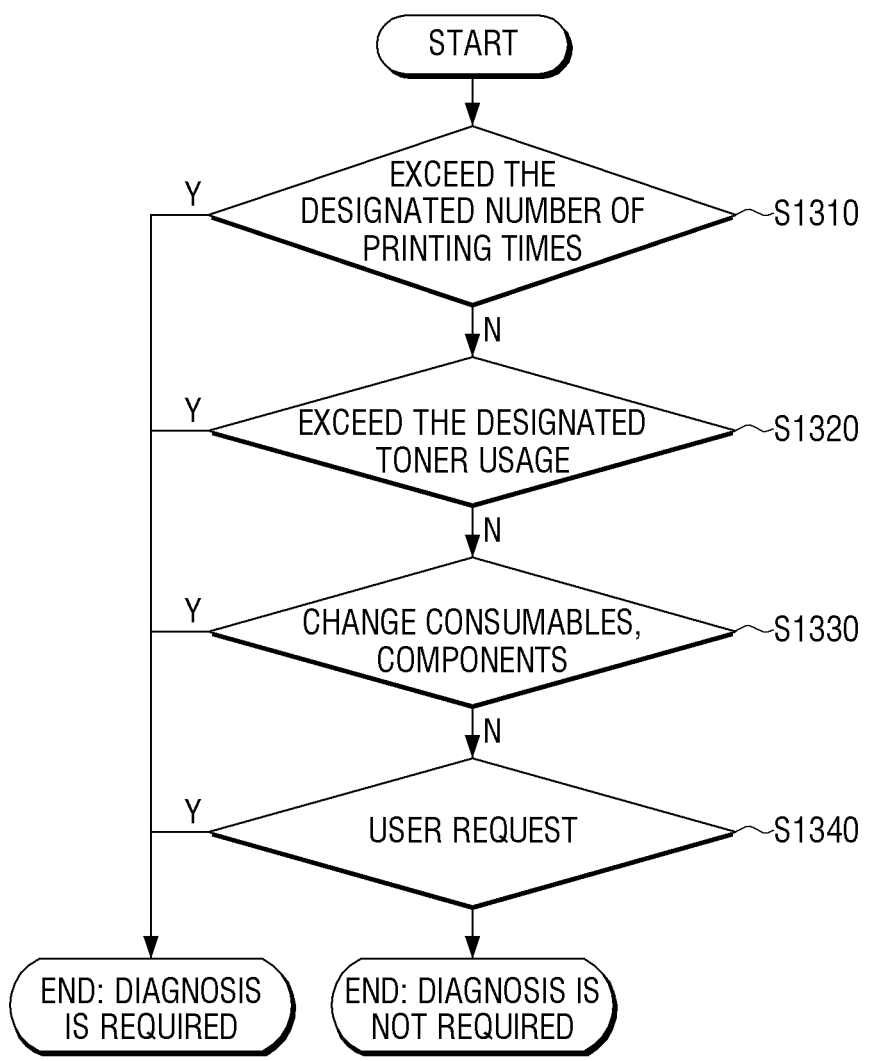
FIG. 13 illustrates an exemplary determination operation.

FIG. 13 is a flow chart illustrating an exemplary determining operation illustrated in FIG. 11 in detail.

As illustrated in FIG. 13, it is determined whether an image forming apparatus performs printing more than the predetermined number of printing times (S1310).

In response to the image forming apparatus printing for the predetermined number of times or more (S1310—Y), diagnosis and correction may be determined to be necessary.

On the contrary, in response to the image forming apparatus not printing less than the predetermined number of times (S1310—N), it is determined whether toner usage exceeds the predetermined toner usage (S1320).

In response to the toner usage exceeding the predetermined toner usage (S1320—Y), diagnosis and correction may be determined to be necessary.

To the contrary, in response to the toner usage not exceeding the predetermined toner usage (S1320—N), it is determined whether consumables are changed (S1330).

In response to the consumables being changed (S1330—Y), diagnosis and correction may be determined to be necessary.

To the contrary, in response to the consumables not being changed (S1330—N), it is determined whether there is a request for diagnosis and correction from the user.

In response to the request for diagnosis and correction being made by the user (S1340—Y), diagnosis and correction may be determined to be necessary. On the other hand, in response to the request for diagnosis and correction not being made by the user (S1340—N), diagnosis and correction may be determined to be unnecessary.

In describing the example illustrated FIG. 13, it was described to determine whether diagnosis is necessary in order of the number of printing times in comparison with the predetermined number of printing times, toner usage, consumable changes, and a user request, etc., but according to an exemplary embodiment, whether diagnosis is necessary may be determined in a different order, and/or may be determined by adding and/or using other items.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image forming apparatus, comprising:
a scanner configured to scan a manuscript disposed on an upper surface of a plate by using a scan module; and
a cover unit disposed on an upper surface of the plate to prevent the scan module from being supplied with external light while the scanner scanning the manuscript;
wherein the cover unit comprises:
a belt unit where an original chart, which is used to diagnose and correct the image forming apparatus, and a white background sheet are disposed in a form of a belt in a row, and
a driving unit configured to drive the belt unit to rotate for disposing selectively the original chart and the white background sheet to correspond to the plate.

2. The apparatus as claimed in claim 1, further comprising:
a controller configured to, in response to diagnosis or correction for the image forming apparatus being necessary, control the driving unit to dispose the original chart on an upper surface of the plate, and in response to the scanner completing scanning of the original chart, control the driving unit to place the white background sheet on an upper surface of the plate.

3. The apparatus as claimed in claim 1, wherein the belt unit is disposed such that the original chart is on a predetermined fixed position of an upper surface of the plate.

4. The apparatus as claimed in claim 1, wherein the cover unit comprises:
the belt unit where the original chart and a transparent sheet are disposed in a form of a belt in a row,
an original chart unit where the original chart is disposed on a fixed position in a space between belts of the belt unit, and
the driving unit configured to drive the belt unit.

5. The apparatus as claimed in claim 4, further comprising:
a controller configured to, in response to diagnosis or correction for the image forming apparatus being necessary, control the driving unit to dispose a transparent sheet between the original chart and an upper surface of the plate, and in response to the scanner completing scanning of the original chart, control the driving unit to dispose a white background sheet between the original chart and an upper surface of the plate.

6. The apparatus as claimed in claim 4, wherein the cover unit further comprises:
a chart driving unit configured to in response to the transparent sheet being positioned between the original chart and an upper surface of the plate, operate to place the original chart unit directly onto the transparent sheet.

7. The apparatus as claimed in claim 1, further comprising:
a controller in response to diagnosis or correction for the image forming apparatus being necessary, control the scanner to scan the sheet.

8. The apparatus as claimed in claim 7, wherein the controller determines whether diagnosis or correction is necessary based on at least one of the number of times of printing, toner usage, replacement of consumables, and a request of a user.

9. The apparatus as claimed in claim 7, further comprising:
an image forming unit configured to print the scanned original chart,
wherein the scanner generates a second scan image by scanning the printed original chart, and
wherein the controller diagnoses or corrects copy performance of the image forming apparatus by using the second scan image.

10. The apparatus as claimed in claim 9, wherein the controller diagnoses at least one item of a copy margin, copy skew, copy magnification, copy optical density (OD), and a copy background.

11. The apparatus as claimed in claim 9, further comprising:
a storage configured to store at least one of a color conversion table and a parameter table; and
a correction unit configured to change at least one of the color conversion table and the parameter table by using the second scan image.

12. The apparatus as claimed in claim 9, further comprising:
a user interface configured to display a result of the diagnosis.

13. An image forming comprising:
a scanner configured to scan a manuscript disposed on an upper surface of a plate by using a scan module; and
a cover unit disposed on an upper surface of the plate to prevent the scan module from being supplied with external light while the scanner scanning the manuscript,
wherein the cover unit comprises:
an original chart unit disposed on a fixed position of an upper surface of a plate, and
a manual open-close cover disposed between an upper surface of the plate and the original chart unit and in response to the cover being closed, disposed such that a white background sheet is on an upper surface of the plate, and configured to open the original chart unit by a user manipulation.

14. The apparatus as claimed in claim 13, further comprising:
a user interface configured to in response to diagnosis or correction for the image forming apparatus being necessary, display information informing that diagnosis or correction is performed by manipulating the manual open-close cover; and
a controller configured to in response to the original chart being disposed on an upper surface of the plate by an operation of the open-close cover, control the scanner to scan the original chart.

15. A diagnosing method of an image forming apparatus comprising a scanner and a cover unit that prevents the scanner from being supplied with external light, the method comprising:
determining whether a diagnosis or a correction is necessary;
in response to the diagnosis or the correction being determined as necessary, disposing an original chart, which is used to diagnose and correct the image forming apparatus, positioned in the cover unit on an upper surface of a plate of the scanner by driving a belt unit in the cover unit to rotate, the belt unit where the original chart and a white background sheet being disposed in a form of a belt in a row;
scanning and printing the original chart;
disposing the white background sheet positioned in the cover unit on an upper surface of a plate of the scanner by driving the belt unit to rotate; and diagnosing copy performance of the image forming apparatus by scanning the printed original chart.

16. The method as claimed in claim 15, further comprising: changing at least one of a pre-stored color conversion table and a parameter table by using a scan image of the printed original chart.

17. The method as claimed in claim 15, wherein the diagnosing comprises diagnosing at least one of a copy margin, copy skew, copy magnification, copy OD, and a copy background.

18. The method as claimed in claim 15, further comprising: displaying a result of the diagnosis.

\* \* \* \* \*